United States Patent
Yagi et al.

(10) Patent No.: US 9,694,443 B2
(45) Date of Patent: Jul. 4, 2017

(54) LASER WELDING APPARATUS AND LASER WELDING METHOD

(71) Applicant: Furukawa Electric Co., Ltd., Tokyo (JP)

(72) Inventors: Saburo Yagi, Tokyo (JP); Takashi Shigematsu, Tokyo (JP); Masaya Satou, Tokyo (JP); Shinya Kojima, Tokyo (JP)

(73) Assignee: Furukawa Automotive Systems Inc., Tokyo (JP)

( * ) Notice: Subject to any disclaimer, the term of this patent is extended or adjusted under 35 U.S.C. 154(b) by 0 days.

(21) Appl. No.: 14/832,275

(22) Filed: Aug. 21, 2015

(65) Prior Publication Data

US 2015/0360319 A1     Dec. 17, 2015

Related U.S. Application Data

(63) Continuation of application No. PCT/JP2014/054388, filed on Feb. 24, 2014.

(30) Foreign Application Priority Data

Feb. 22, 2013 (JP) .................................. 2013-033945

(51) Int. Cl.
 *B23K 26/20* (2014.01)
 *H01R 4/18* (2006.01)
 (Continued)

(52) U.S. Cl.
 CPC ............ *B23K 26/20* (2013.01); *B23K 26/032* (2013.01); *B23K 26/044* (2015.10);
 (Continued)

(58) Field of Classification Search
 CPC .. B23K 26/262; B23K 26/702; B23K 26/046; B23K 26/084; B23K 26/082;
 (Continued)

(56) References Cited

U.S. PATENT DOCUMENTS

| | | |
|---|---|---|
| 4,287,402 A | 9/1981 | Hentzschel et al. |
| 2001/0003687 A1 | 6/2001 | Kondo |
| 2006/0081575 A1 | 4/2006 | Egawa et al. |

FOREIGN PATENT DOCUMENTS

| | | |
|---|---|---|
| CN | 1286654 A | 3/2001 |
| CN | 1759971 A | 4/2006 |

(Continued)

OTHER PUBLICATIONS

International Search Report and Written Opinion dated Apr. 22, 2014 for PCT/JP2014/054388.

(Continued)

*Primary Examiner* — Tu B Hoang
*Assistant Examiner* — Erin McGrath
(74) *Attorney, Agent, or Firm* — Thompson Coburn, LLP; Alan H. Norman (57) ABSTRACT

A laser welding apparatus that welds a butted interface of a workpiece by laser light irradiation while successively feeding the workpiece having the butted interface to a welding position includes an X- and Y-axis scanner that scans laser light outputted from a laser light source in an X-axis direction and a Y-axis direction which are orthogonal to each other, a measuring device that measures a dimension along the butted interface, and a scanner control device that controls driving of the X- and Y-axis scanner so as to weld the butted interface by laser light irradiation.

11 Claims, 6 Drawing Sheets

(51) Int. Cl.
　　　H01R 43/02　　　(2006.01)
　　　H01R 43/048　　(2006.01)
　　　B23K 26/03　　　(2006.01)
　　　B23K 26/046　　(2014.01)
　　　B23K 26/08　　　(2014.01)
　　　B23K 26/082　　(2014.01)
　　　B23K 26/044　　(2014.01)
　　　B23K 26/262　　(2014.01)
　　　G01B 11/14　　　(2006.01)
　　　B23K 26/70　　　(2014.01)
　　　H01R 4/20　　　(2006.01)
　　　H01R 43/055　　(2006.01)
　　　B23K 101/38　　(2006.01)

(52) U.S. Cl.
　　　CPC .......... *B23K 26/046* (2013.01); *B23K 26/082* (2015.10); *B23K 26/0846* (2013.01); *B23K 26/262* (2015.10); *B23K 26/702* (2015.10); *G01B 11/14* (2013.01); *H01R 4/187* (2013.01); *H01R 43/0221* (2013.01); *H01R 43/048* (2013.01); *B23K 2201/38* (2013.01); *H01R 4/20* (2013.01); *H01R 43/055* (2013.01)

(58) Field of Classification Search
　　　CPC .... B23K 26/044; B23K 26/20; B23K 26/032; B23K 2201/38; H01R 4/187; H01R 43/0221; H01R 43/048; H01R 4/20; H01R 43/055; G01B 11/14
　　　See application file for complete search history.

(56) References Cited

FOREIGN PATENT DOCUMENTS

| | | | |
|---|---|---|---|
| JP | 59030487 A | * | 2/1984 |
| JP | H06-344165 A | | 12/1994 |
| JP | H10193148 A | | 7/1998 |
| JP | 2000-167678 A | | 6/2000 |
| JP | 2001-058285 A | | 3/2001 |
| JP | 2001-167821 A | | 6/2001 |
| JP | 2011-224618 A | | 11/2001 |
| JP | 2003-181669 A | | 7/2003 |
| JP | 2005-014027 A | | 1/2005 |
| JP | 2005014027 A | * | 1/2005 |
| JP | 2008-137011 A | | 6/2006 |
| JP | 2007-038267 A | | 2/2007 |
| JP | 2007-283337 A | | 11/2007 |
| JP | 2007-283398 A | | 11/2007 |
| JP | 2009297742 A | | 12/2009 |
| JP | 2011224618 A | * | 11/2011 |
| JP | 2012-069449 A | | 4/2012 |

OTHER PUBLICATIONS

Office Action dated Jun. 30, 2014 for corresponding Japanese Patent Application No. 2014-512565.
Decision to Grant dated Oct. 14, 2014 for corresponding Japanese Patent Application No. 2014-512565.
English translation of Written Opinion for PCT/JP2014/054388 dated Apr. 22, 2014.
English translation of International Preliminary Report on Patentability (Chapter I) for PCT/JP2014/054388 dated Aug. 25, 2015.
Office Action for CN Application 201480009850.6 dated Jul. 26, 2016.
Office Action for CN Application 201480009850.6 dated Jan. 3, 2017.

* cited by examiner

LASER WELDING APPARATUS AND LASER WELDING METHOD

CROSS REFERENCE TO RELATED APPLICATIONS

This is a continuation application of International Patent Application No. PCT/JP2014/054388 filed Feb. 24, 2014, which claims the benefit of Japanese Patent Application No. 2013-033945, filed Feb. 22, 2013, the full contents of all of which are hereby incorporated by reference in their entirety.

BACKGROUND

Technical Field

The present disclosure relates to a laser welding apparatus and a laser welding method in which a butted interface or a lapped portion of a workpiece is welded by laser irradiation.

Background

Wire harnesses are often used for internal wiring of automobiles. A wire harness is a module in which a plurality of coated wires are assembled in accordance with in-vehicle wiring specifications. Terminals for connection (hereinafter referred to as crimp terminals) are crimped to ends of each of the coated wires. When connecting a crimp terminal to a wire end of the wire harness, electrical connection between the wire end and the crimp terminal is provided by stripping the insulating coating layer at a wire end to expose the core wire, and swaging and crimping a core wire barrel of the crimp terminal to the exposed portion of the core wire. The connecting portion between the crimp terminal and the wire end is sealed with resin so as to prevent corrosion of the core wire due to ingress of moisture into the wire from the connecting portion (see Japanese Laid-Open Patent Publication No. 2001-167821 and Japanese Laid-Open Patent Publication No. 2012-069449, for example).

However, sealing the connecting portion of the crimp terminal and the wire end with resin gives rise to an increase in the manufacturing cost of the wire harness. This is because, in addition to the fact that the resin used is expensive in itself, time is required to apply and cure the resin in a resin molding process or a coating process.

Thus, attempts have been made to bend the crimp portion (wire connecting portion) of the crimp terminal by pressing and to join, by laser welding, an entire butted interface between opposite ends of a plate material formed in a portion bent into a tubular shape, so that the crimp portion has a closed structure. The portion bent into a tubular shape has a tapered curved shape or a constricted curved shape at one end portion thereof (see FIG. 8). Thus, in order to join the butted interface of the portion bent into a tubular shape by laser welding, the focus of laser light needs to be moved along the butted interface.

The present disclosure is related to providing a laser welding apparatus and a laser welding method that enable laser welding of the butted interface of the workpiece with high quality.

SUMMARY

According to a first aspect of the present disclosure, a laser welding apparatus that welds a butted interface of a workpiece by laser light irradiation by successively feeding the workpiece having the butted interface to a welding position is provided, and the laser welding apparatus includes an X- and Y-axis scanner that scans laser light outputted from a laser light source in an X-axis direction and a Y-axis direction which are orthogonal to each other, a measuring device that measures a dimension along the butted interface, and a scanner control device that controls driving of the X- and Y-axis scanner so as to weld the butted interface by laser light irradiation.

By accurately measuring the dimension of the butted interface of the workpiece and controlling driving of the X- and Y-axis scanner, the laser welding apparatus configured as described above can scan laser light, in other words, move the focus of laser light, along the butted interface. Thus, laser welding of the butted interface with high quality can be achieved.

In the laser welding apparatus according to the present disclosure, the measuring device desirably measures a dimension of a gap at the butted interface. In butt welding, in a case where there is a gap beyond a predetermined limit, welding quality is significantly degraded, but by measuring the gap before welding, defects and variations among products can be suppressed. Further, a press machine may be stopped or an alert may be issued when the gap comes beyond the predetermined limit.

In the laser welding apparatus according to the present disclosure, the measuring device measures a dimension of a gap between a lapped portion in which an upper portion and a lower portion of a plate material of the workpiece are lapped in a planar manner. In lap welding, in a case where there is a gap beyond a predetermined limit, welding quality is significantly degraded, but by measuring the gap before welding, defects and variations among products can be suppressed. Further, a press machine may be stopped or an alert may be issued when the gap comes beyond the predetermined limit.

The laser welding apparatus according to the present disclosure desirably has a workpiece holding mechanism that holds the workpiece fed to the welding position at an appropriate position in an appropriate orientation, and laser light irradiation is performed while the workpiece is held by the workpiece holding mechanism. When welding is performed by laser irradiation with the workpiece being held by the workpiece holding mechanism, the workpiece can be accurately welded.

According to a second aspect of the present disclosure, a laser welding method of welding a butted interface of a workpiece by laser light irradiation while successively feeding the workpiece having the butted interface to a welding position is provided, and the laser welding method includes using an X and Y axis scanner that scans laser light outputted from a laser light source in a two dimensional plane in an X axis direction and a Y axis direction which are orthogonal to each other, measuring a dimension along the butted interface, and controlling driving of the X and Y axis scanner so as to weld the butted interface by laser light irradiation.

According to the laser welding apparatus and laser welding method according to the present disclosure, laser light can be scanned along the butted interface by accurately measuring the dimension of the butted interface of the workpiece and controlling driving of the X- and Y-axis scanner. Thus, laser welding of the butted interface with high quality can be achieved.

DETAILED DESCRIPTION

Preferred embodiments of the present disclosure will be described below.

In the embodiments, an apparatus configuration for manufacturing a crimp terminal 80 illustrated in FIG. 8 will be described. As shown in FIG. 9, the crimp terminal 80 is manufactured through a series of steps of (a) successively feeding a belt-shaped metal plate 81 in a longitudinal direction of the metal plate 81 (the direction of arrow A) at a constant pitch, (b) punching out a carrier portion 82 and a terminal material 83 in a spread-out state, (c) integrally shaping a box-shaped connector portion 84 and a tubular crimp portion 85 by punching and bending the terminal material 83, (d) joining, by laser welding, a butted interface 86a between opposite ends of a plate material and a lapped portion 86b that are formed in the crimp portion 85. The butted interface refers to a portion in which one end surface and another end surface, in a bending direction, of the plate material constituting the crimp portion 85 of the plate material are brought into butting contact with each other.

First Embodiment

Figure 1:
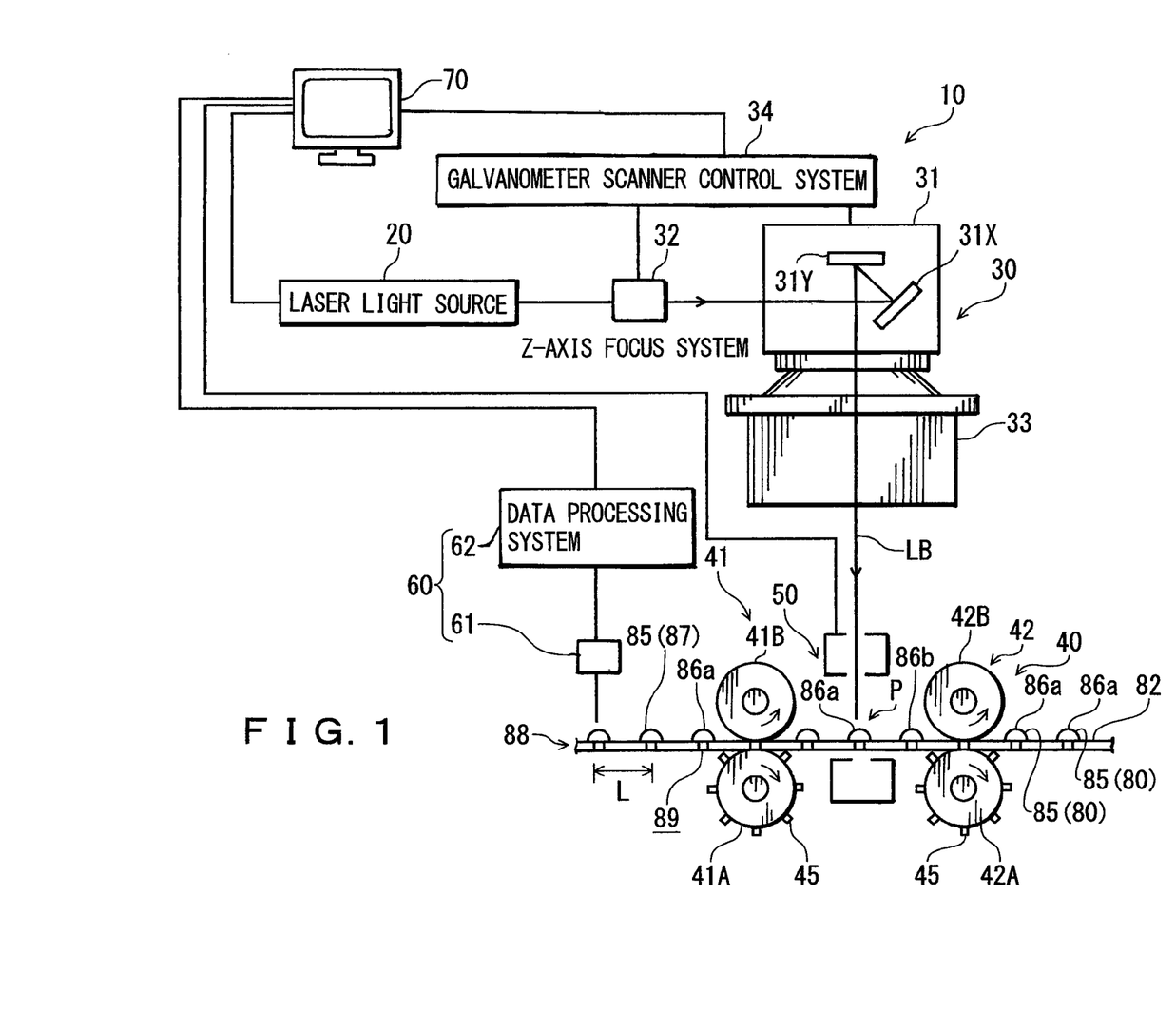
FIG. 1 is a diagram of a configuration of an apparatus according to a first embodiment of the present disclosure.
Figure 9A:
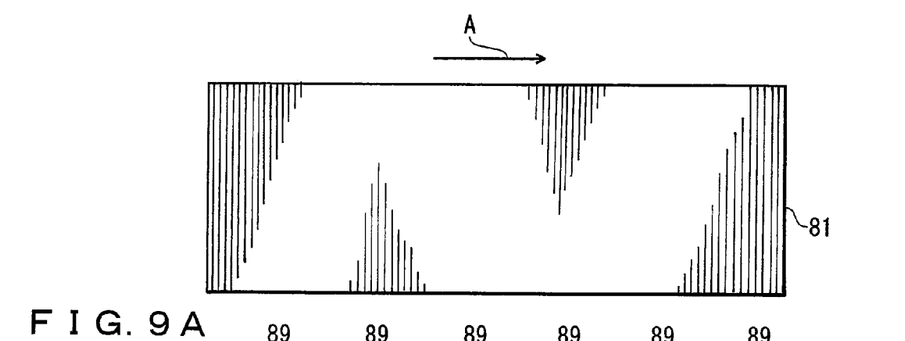
FIGS. 9A to 9D are diagrams schematically showing a process of manufacturing the crimp terminal in FIG. 8.
Figure 9B:
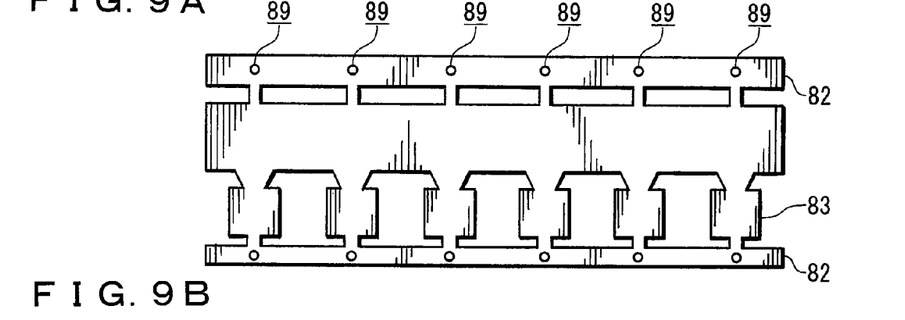
Figure 9C:
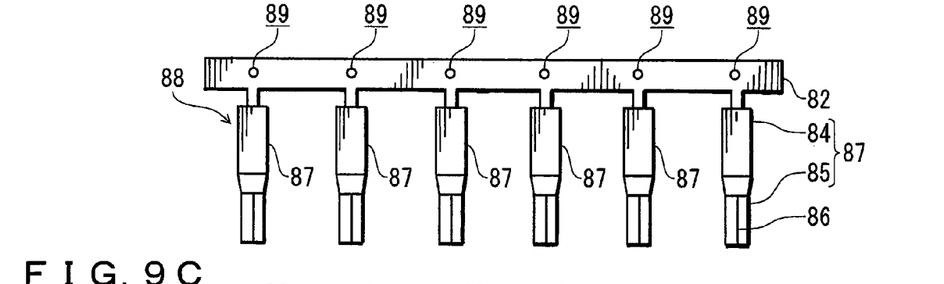
Figure 9D:
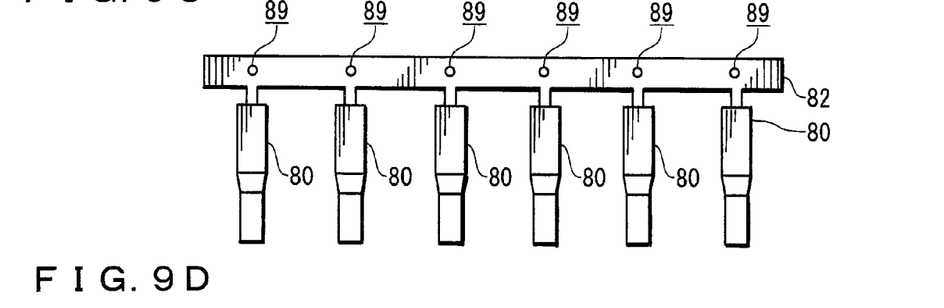

FIG. 1 is a diagram of a system configuration showing a first embodiment of a laser welding apparatus according to the present disclosure. A laser welding apparatus 10 successively feeds unwelded crimp terminals 87 serving as workpieces, to a welding position, and welds the butted interface 86a and the lapped portion 86b in the crimp portion 85 of each of the crimp terminals 87 by laser welding. As shown in FIG. 9C, the crimp terminals 87 are successively fed to a welding position P in the form of a chained terminal 88 in which the crimp terminals 87 are supported by the carrier portion 82 in a cantilever manner at regular intervals. At the welding position P, the crimp terminals 87 are welded by laser irradiation.

The laser welding apparatus 10 has a laser light source 20, a laser irradiation optical device 30, a conveying device 40, a workpiece holding mechanism 50, a measuring device 60, and a control device 70.

The laser light source 20 is a known fiber laser that uses quartz optical fiber doped with a rare earth element as a laser medium to oscillate laser light at a wavelength in a near infrared region.

The laser irradiation optical device 30 is an optical device that guides laser light that is outputted from the laser light source 20 to the welding position P. The laser irradiation optical device 30 has an X- and Y-axis scanner 31, a Z-axis scanner 32, and a condenser lens 33.

The X- and Y-axis scanner 31 is a biaxial (XY) galvanometer scanner that sequentially reflects laser light LB from the laser light source 20 with two mirrors 31X and 31Y that are angle controlled in synchronous with each other about axes that are mutually orthogonal. Thus, the laser light LB is irradiated on and swept along the butted interface 86a and the overlapped portion 86b of the crimp terminal 87 stopped at the welding position P.

Figure 4:
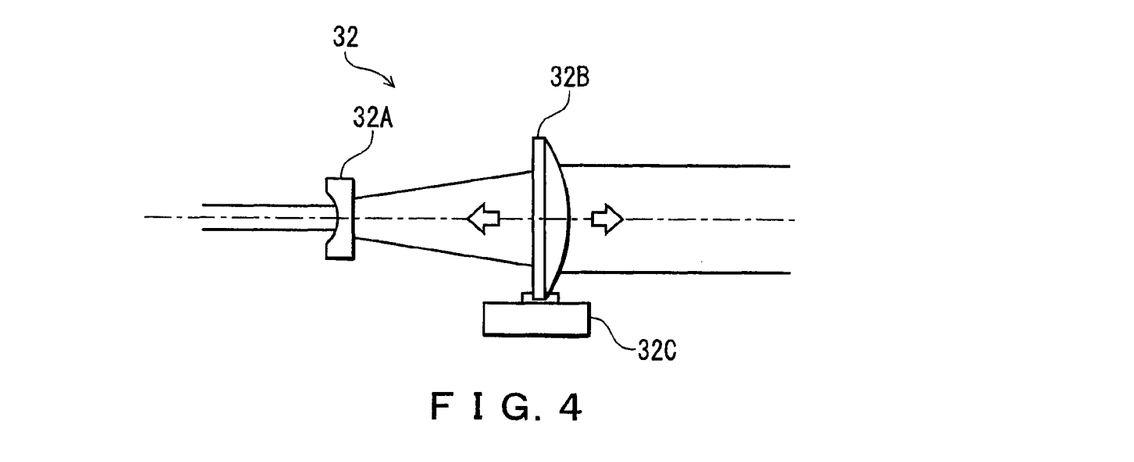
FIG. 4 is a diagram showing an example of a configuration of an optical coupling system of a Z-axis scanner.

The Z-axis scanner 32 is an optical device that adjusts a focal position of the laser light LB scanned by the X- and Y-axis scanner 31 in an irradiation direction (Z-axis direction). The Z-axis scanner 32 is provided on an optical path of the laser light LB incident on the X- and Y-axis scanner 31. As shown in FIG. 4, the Z-axis scanner 32 has an incidence lens 32A situated on the laser light source 20 side, an emission lens 32B situated on the X- and Y-axis scanner 31 side, and a lens driving mechanism 32C that moves the emission lens 32B in the direction of the optical axis of the incidence lens 32A. In an example in FIG. 4, the incidence lens 32A is a planoconcave lens, and the emission lens 32B is a planoconvex lens.

The driving of the X- and Y-axis scanner 31 and the Z-axis scanner 32 is controlled by a galvanometer control system 34. The irradiation position of the laser light LB in a horizontal plane can be adjusted by controlling the angles of the mirrors 31X and 31Y. The speed at which the laser light LB is swept can be adjusted by controlling the rotational speeds of the mirrors 31X and 31Y. The focal position of the laser light LB in the irradiation direction can be adjusted by controlling the position of the emission lens 32B with respect to the incidence lens 32A.

The condenser lens 33 is an optical coupling system that condenses the laser light LB from the X and Y axis scanner 31 at the positions of the butted interface 86a and the lapped portion 86b of the crimp terminal 87. The condenser lens 33 is a telecentric lens or an fθ lens.

The conveying device 40 is a device that conveys the chained terminal 88 at a constant pitch corresponding to intervals L at which the crimp terminals 87 are arranged to successively feed the crimp terminals 87 to the welding position P. The conveying device 40 has pairs of rollers 41 and 42 arranged near the welding position P on an upstream side and a downstream side, respectively, in a direction in which the chained terminal 88 is conveyed. The pairs of rollers 41 and 42 rotate while sandwiching the carrier portion 82 of the chained terminal 88 between the rollers 41 and 42 arranged in the vertical direction. The pairs of rollers 41 and 42 include conveying rollers 41A and 42A that are in contact with a lower surface of the carrier portion 82 and presser rollers 41B and 42B that are in contact with an upper surface of the carrier portion 82. The presser rollers 41B and 42B are rotated in conjunction with rotation of the rollers 41A and 42A while pressing the carrier portion 82 downward. The conveying rollers 41A and 42A are rotationally driven at a constant speed by a driving mechanism not shown in the drawings. Feeding pawls 45 are provided on an outer circumferential surface of each of the conveying rollers 41A and 42A, at regular intervals in a circumferential direction so as to project from the outer circumferential surface. The feeding pawls 45 engage with perforations 89 (see FIG. 9C) in the carrier portion 82. As the conveying rollers 41A and 42A rotate through a given angle, the feeding pawls 45 engaged with the perforations 89 in the carrier portion 82 move the chained terminal 88 through a distance equal to the interval L between the crimp terminals 87.

Figure 2A:
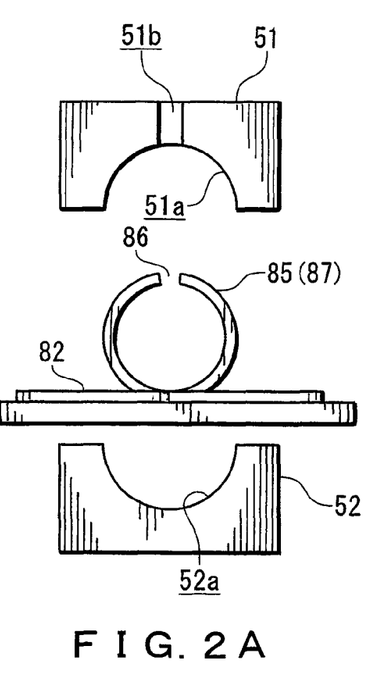
FIG. 2A is a conceptual diagram illustrating a workpiece with a gap created at a butted interface and a configuration of a clamp device that has not clamped the workpiece yet.
Figure 2B:
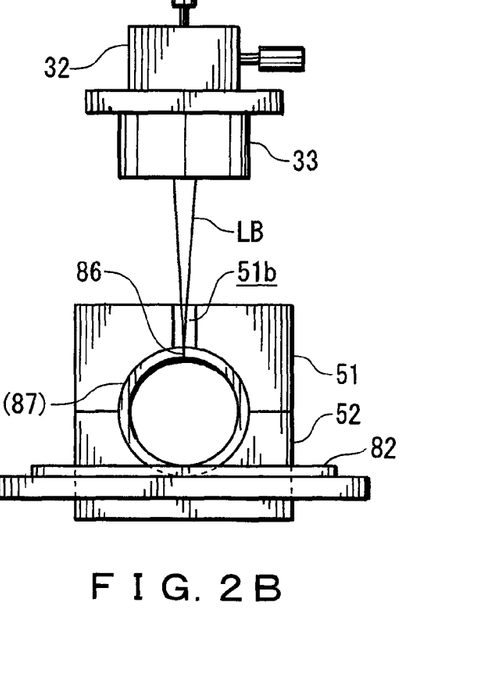
FIG. 2B is a conceptual diagram illustrating that, with the workpiece being clamped by the clamp device, the butted interface of the workpiece is being irradiated with laser light.

The workpiece holding mechanism 50 is a device that holds the crimp terminal 87 fed to the welding position P at an appropriate position in an appropriate orientation and which eliminates a gap at the butted interface 86a. The workpiece holding mechanism 50 has an upper clamp jig 51 and a lower clamp jig 52 to sandwich the crimp portion 85 of the crimp terminal 87 between the upper clamp jig 51 and the lower clamp jig 52. As shown in FIG. 2A and FIG. 2B, the clamp jigs 51 and 52 include half-cylindrical recessed portions 51a and 52a that are butted into a cylindrical shape. The crimp portion 85 is held at the appropriate position in the appropriate orientation by sandwiching the crimp portion 85 of the crimp terminal 87 between the upper clamp jig 51 and the lower clamp jig 52. Even if a gap is created at the butted interface 86a of the crimp portion 85, end surfaces across the gap portion are forcibly brought into pressure contact with each other to eliminate the gap. The upper clamp jig 51 includes a slit 51b formed therein so as to not to obstruct irradiation of the butted interface 86a with the laser light LB.

Further, if the upper clamp jig 51 (lower clamp jig 52) fails to be separated from the crimp portion 85 after laser welding, a presser member that presses and holds a part of the chained terminal 88 may be provided.

Figures 3A, 3B:
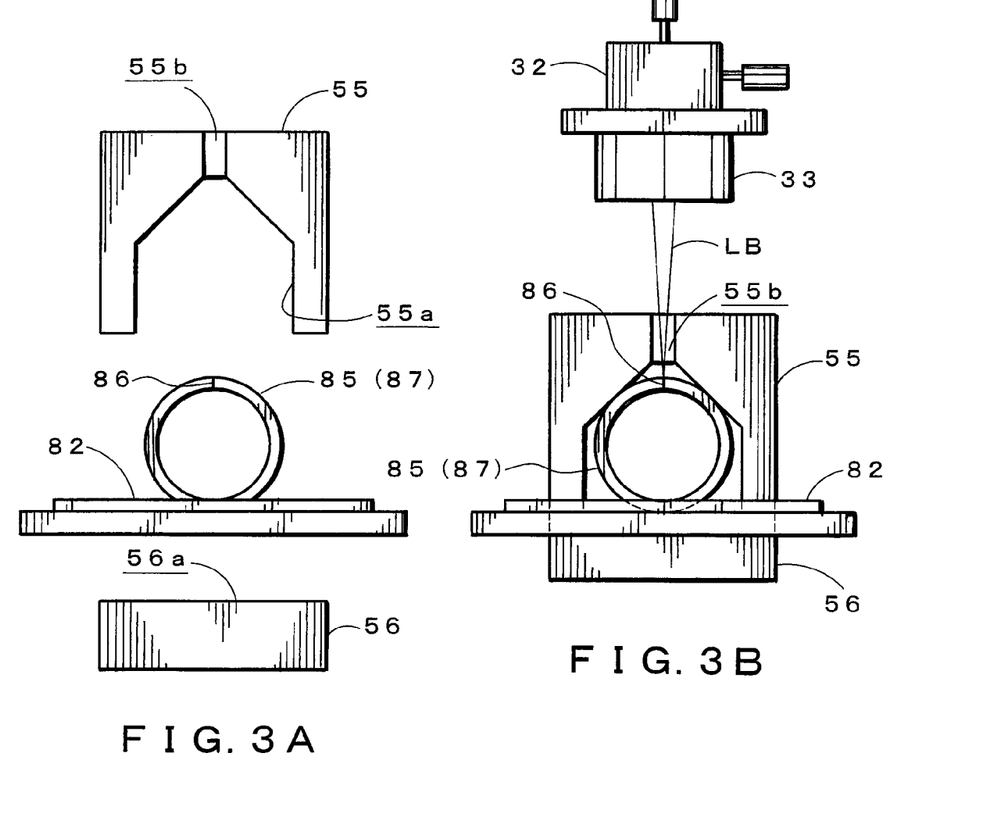
FIG. 3A is a conceptual diagram illustrating a workpiece with a gap created at a butted interface and a configuration of a clamp device that has not clamped the workpiece yet.
FIG. 3B is a conceptual diagram illustrating that, with the workpiece being clamped by the clamp device, the butted interface of the workpiece is being irradiated with laser light.

The workpiece holding mechanism 50 is not limited to the configuration shown in FIG. 2A and FIG. 2B. If no gap is created at the butted interface 86a of the crimp portion 85 formed by bending, for example, a configuration shown in FIG. 3A and FIG. 3B may be adopted. That is, the workpiece holding mechanism 50 has an upper clamp jig 55 and a lower clamp jig 56 to hold the crimp portion 85 of the crimp terminal 87 from positions above and below with respect to the crimp portion between the upper clamp jig 55 and the lower clamp jig 56 to be in contact at least at three points. Thus, the clamp jig 55 includes, for example, a pair of inclined surfaces 55a, which is also referred to as a substantially truncated chevron shape portion 55a, which is in contact with the crimp portion 85 at two points to hold the crimp portion 85. On the other hand, the clamp jig 56 includes a generally flat contact surface 56a that is in contact with the crimp portion 85 at one point. The crimp portion 85 of the crimp terminal 87 is held between the upper clamp jig 55 and the lower clamp jig 56 from above and below to enable the butted interface 86a of the crimp portion 85 to be positioned at a position where the laser light LB can be irradiated as shown in FIG. 3B. Further, the upper clamp jig 55 includes a slit 55b so as not to obstruct irradiation of the butted interface 86a with the laser light LB.

The measuring device 60 has a shape detector 61 using a CCD camera or the like and a data processing system 62.

The shape detector 61 is installed at a predetermined position upstream of the welding position P so as to face a region where the crimp terminal 87 passes. In this example, the shape detector 61 is provided to face a position located upstream of the welding position P by a distance equivalent to five pitches (L×5).

The shape detector 61 detects the shape of the crimp terminal 87, which is a workpiece, to output detection data on the crimp terminal 87. The shape detector 61 according to the first embodiment includes a CCD camera, not shown. Specifically, the shape detector 61 includes a CCD camera that picks up an image of the dimension of the gap at the butted interface 86a, and a CCD camera that picks up an image of the dimension of the gap between an upper surface and a lower surface of the lapped portion 86b in which the upper portion and the lower portion of the plate material are lapped in a planar manner. Another example of the shape detector may include a laser scanner and a light receiving device neither of which is shown in the drawings. By receiving reflected light from the crimp portion 85 while scanning a surface of the crimp portion 85 of the unwelded crimp terminal 87 with laser light, the shape detector can output a light reception signal as detection data. A method for detecting the gap at the butted interface 86a or the lapped portion 86b may be based on whether an image of light has been picked up, the light being delivered to a tubular portion and leaking from an opposite side of the tubular portion.

The data processing system 62 processes the detection data from the shape detector 61 to measure the dimension of the gap along the butted interface 86a and the dimension of the gap between the upper surface and lower surface of the lapped portion 86b, and outputs the result of the measurement as profile data on the butted interface 86a and the lapped portion 86b. The profile data are input to the control device 70.

By measuring the dimension of the gap at the butted interface 86a and the dimension of the gap between the upper surface and lower surface of the lapped portion 86b, the measuring device 60 configured as described above can suppress defects and variations among products. In other words, in butt welding and lap welding, in a case where there is a gap beyond a predetermined limit, welding quality is significantly degraded, but by measuring the gap before welding, defects and variations among products can be suppressed. Further, a press machine may be stopped or an alert may be issued when the gap comes beyond the predetermined limit.

The control device 70 is a computer system that integrally controls the operation of the laser welding apparatus 10 as an entirety. The control device 70 includes a laser irradiation program for the laser welding apparatus 10 installed therein. The control device 70 executes the laser irradiation program to transmit a control signal based on profile data generated by the measuring device 60 to a galvanometer control system 34. The galvanometer control system 34 controls driving of the X- and Y-scanner 31 and the Z-axis scanner 32 in accordance with the control signal to allow the butted interface 86a and the lapped portion 86b to be welded by laser light irradiation.

Figure 6:
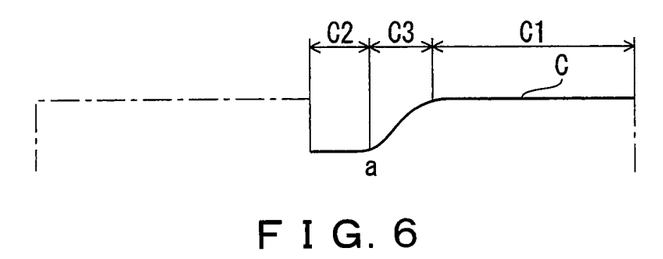
FIG. 6 is a diagram illustrating an example of measurement of a space curve along the butted interface.
Figure 8:
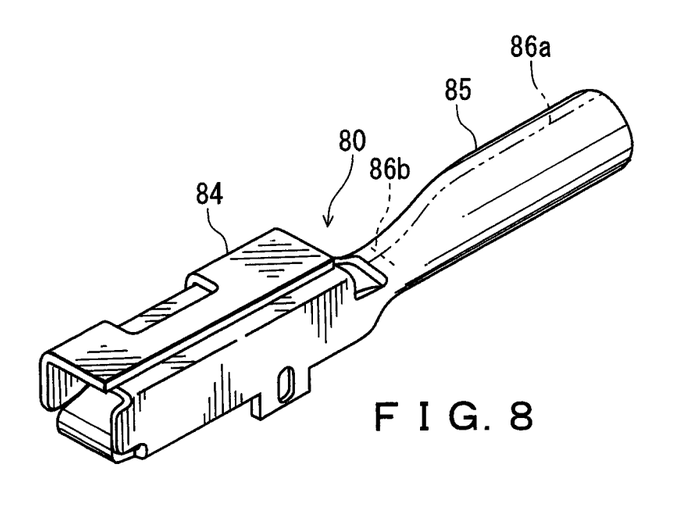
FIG. 8 is a perspective view of a crimp terminal welded by a laser welding apparatus according to the present disclosure.

For the crimp terminal 80 shown in FIG. 8, the shape of a space curve C shown in FIG. 6 and the dimensions of components are measured. Two-dimensional machining is performed on two straight portions C1 and C2 of the space curve C. Three-dimensional machining is performed on a curved portion C3 between the straight portions C1 and C2. The positions, lengths (dimensions), curvatures, inclinations, and the like of the portions C1, C2, and C3 are reflected in control operations based on the laser irradiation program. The lapped portion 86b is programmed to be welded at a position at a predetermined distance from the lowest point (a) of the curved portion C3 so that a scan line for the lapped portion 86b crosses a scan line for butt welding. The measured value of the width dimension of the terminal at this position is reflected in the control operations based on the laser irradiation program.

As described above, the laser welding apparatus 10 measures the dimension of the gap at the butted interface 86a of the crimp terminal 87, which is a workpiece, and the dimension of the gap between the upper surface and the lower surface of the lapped portion 86b and controls driving of the X- and Y-axis scanner and the Z-axis scanner based on the result of the measurement. The laser welding apparatus 10 thus accurately three-dimensionally controls the focal position of the laser light LB so that the laser light LB has an intensity enabling welding at an irradiation position, while scanning the laser light along the butted interface 86a and the lapped portion 86b. As a result, laser welding of the butted interface 86a and lapped portion 86b of the crimp terminal 87 with high quality can be achieved. Measurement with the measuring device 60 need not be performed on all the crimp terminals 87. Measurement may be performed on at least one crimp terminal 87 during an initial stage when welding is started with the chained terminal 88 being set in the laser welding apparatus 10. When profile data are set on the control device 70 to be automatically updated when the workpiece is changed to a crimp terminal 87 with a different shape and a different size, the need for an operator's numerical input operation and the like associated with a change in the workpiece is eliminated. Thus, a laser welding line can be efficiently operated.

Further, welding is performed by laser light irradiation with the crimp terminal 87, which is a workpiece, held between the upper clamp jig 51 and the lower clamp jig 52. Thus, all the crimp terminals 87 consecutively conveyed to the welding position P can be accurately welded.

Second Embodiment

Figure 7:
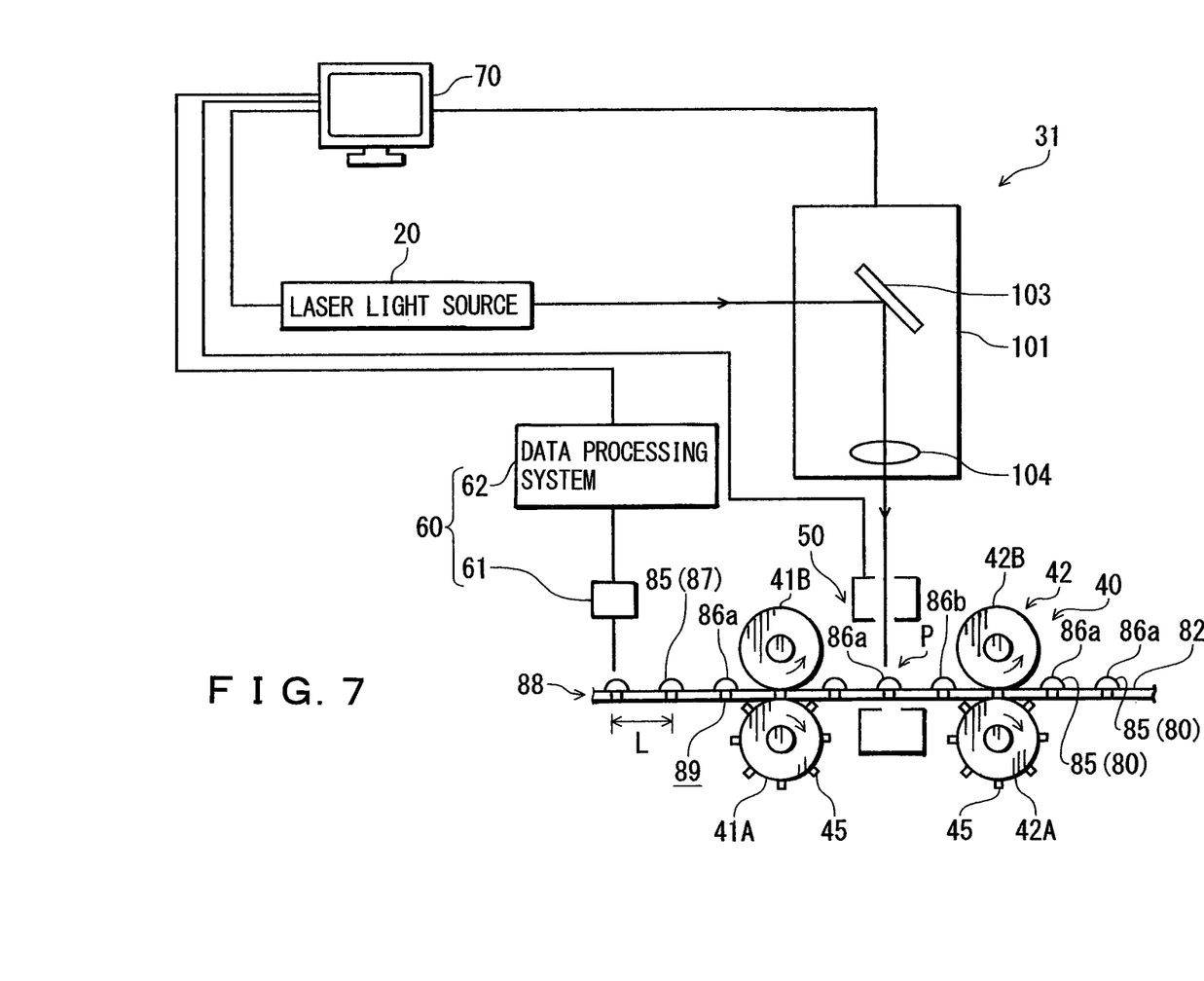
FIG. 7 is a diagram of a configuration of an apparatus according to a second embodiment of the present disclosure.

FIG. 7 is a diagram of a system configuration showing a second embodiment of the laser welding apparatus according to the present disclosure. Components of the second embodiment which are common to the first embodiment are denoted by the same reference numerals in FIG. 7. Description of these components is omitted as appropriate. The laser welding apparatus according to the second embodiment has a laser machining head 101 and a robot arm not shown in the drawings. The robot arm moves the laser machining head 101 itself in an X-direction, a Y-direction, and a Z-direction to sweep laser light LB. The laser machining head 101 includes a dielectric multilayer film plane mirror 103 that reflects the laser light LB from the laser light source 20 downward to illuminate the welding position P, and a condenser lens 104 that condenses the laser light LB from the dielectric multilayer film plane mirror 103 at the position of the butted interface 86a of the crimp terminal 87, which are provided therein. The laser welding apparatus 10 according to the second embodiment also controls driving of the robot arm based on the result of measurement with the measuring device 60 to allow the laser machining head 101 to be accurately moved in three-dimensional directions. The laser welding apparatus 10 thus accurately three-dimensionally controls the focal position of the laser light LB so that the laser light LB has an intensity enabling welding at an irradiation position. Thus, laser welding of the butted interface 86a and lapped portion 86b of the crimp terminal 87 with high quality can be achieved.

Other Embodiments

The configuration of the present disclosure is not limited to the above-described embodiments. Laser welding with high quality can be achieved even in a case where the laser irradiation optical apparatus 30 is not provided with the Z-axis scanner 32 and scans the focal position of the laser light LB only in the X-axis direction and the Y-axis direction by controlling driving of the X- and Y-axis scanner 31 based on the result of measurement with a butted interface shape measuring device 60. Further, in the crimp portion 85 of the crimp terminal 80, a lapped portion in which opposite ends of a plate material are lapped may be formed instead of the butted interface. In a case where the lapped portion is formed in the crimp portion instead of the butted interface, the laser welding apparatus may measure the dimension along the lapped portion using the measuring device, and controls driving of the X- and Y-axis scanner based on the result of the measurement, while welding the lapped portion by laser light irradiation. Thus, laser welding with high quality can be achieved.

Figure 5:
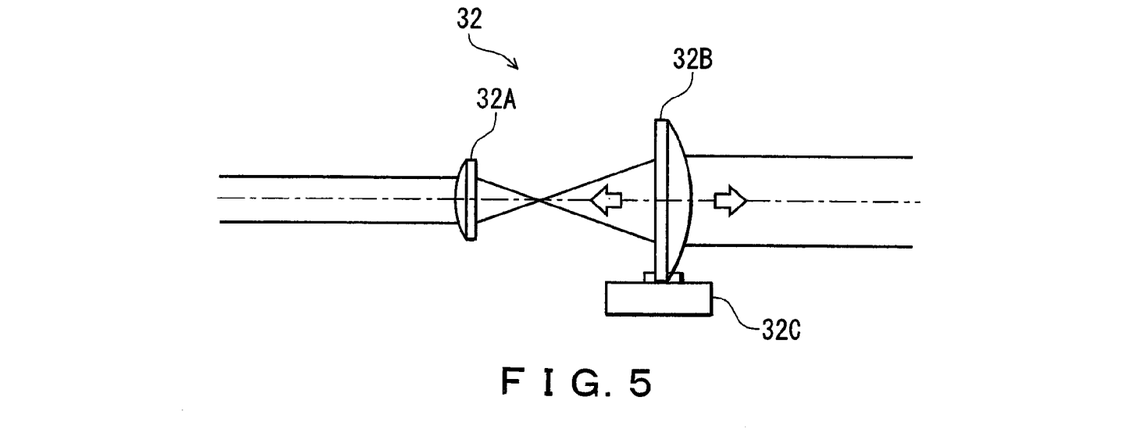
FIG. 5 is a diagram showing another example of the configuration of the optical coupling system of the Z-axis scanner.

Further, the arrangements, numbers, types, and the like of the various mirrors and lenses may be changed as appropriate. In the example in FIG. 4, the incidence lens 32A is a planoconcave lens, and the emission lens 32B is a planoconcave lens. However, both the incidence lens 32A and the emission lens 32B may be planoconcave lenses as shown in FIG. 5. Additionally, in the above-described example, the laser light source 20 is a fiber laser but is not limited to a fiber laser. Also, the crimp portion 85 workpiece is not limited to the crimp terminal 87. That is, the present disclosure is applicable to laser welding apparatuses for workpieces with a butted interface in a metal plate material in general. In addition, an XYZ stage may be used instead of a robot arm.

What is claimed is:

1. A laser welding apparatus adapted to weld a crimp portion of each of a plurality of crimp terminals of a chained terminal by laser light irradiation, the chained terminal including the plurality of crimp terminals supported by a carrier portion at regular intervals, the crimp portion being of a bent plate material and having a butted interface and a lapped portion, at least a portion of the crimp portion being of a tubular shape, the butted interface including first and second ends of the bent plate material adjacent and opposite to each other, the lapped portion having a first portion of the plate material and a second portion of the plate material overlapping each other, the laser welding apparatus comprising:
    a measuring device adapted to measure a first gap and a second gap, the first gap being a distance from the first end to the second end, the second gap being a distance from the first portion of the plate material to the second portion of the plate material;
    a holding mechanism adapted to hold the crimp portion of one of the plurality of crimp terminals;
    an X- and Y-axis scanner adapted to scan laser light outputted from a laser light source in an X-axis direction and a Y-axis direction, the X-axis direction being orthogonal to the Y-axis direction;
    a scanner control device adapted to control driving of the X- and Y-axis scanner based on the measured first and second gaps when the butted interface and the lapped portion are being welded via laser light irradiation;
    a welding device adapted to weld, via laser light irradiation, the crimp portion held by the holding mechanism; and
    a conveying device adapted to convey the chained terminal at a constant pitch corresponding to intervals at which the plurality of crimp terminals are arranged.

2. The laser welding apparatus according to claim 1, wherein the measuring device is adapted to measure the first and second gaps by irradiating light onto the butted interface and the lapped portion, respectively, and detecting light leaking through the first and second gaps.

3. The laser welding apparatus according to claim 1, wherein the holding mechanism has a pair of clamp jigs adapted to sandwich the crimp portion, and one of the clamp jigs has a slit formed therein, the slit being adapted to enable laser light to pass therethrough and irradiate the butted interface of the crimp portion.

4. The laser welding apparatus according to claim 1, wherein the scanner control device is adapted to control driving of the X- and Y-axis scanner based on measurement results of the first and second gaps.

5. The laser welding apparatus according to claim 1, wherein the measuring device is adapted to issue an alert indicating that a welding defect has occurred when at least one of the first and second gaps exceeds a predetermined limit.

6. A method of laser welding a crimp portion of each of a plurality of crimp terminals of chained terminal by laser light irradiation, the chained terminal including the plurality of crimp terminals supported by a carrier portion at regular intervals, the crimp portion being of a bent plate material and having a butted interface and a lapped portion, at least a portion of the crimp portion being of a tubular shape, the butted interface including first and second ends of the plate material adjacent and opposite to each other, the lapped portion having a first portion of the plate material and a second portion of the plate material overlapping each other, the laser welding method comprising:
    measuring a first gap and a second gap, the first gap being a distance from the first end to the second end, the second gap being a distance from the first portion of the plate material to the second portion of the plate material;
    holding one of the plurality of crimp terminals;
    driving, with a scanner control device, an X- and Y-axis scanner based on the measured first and second gaps while irradiating the butted interface and the lapped portion of the crimp terminal so as to weld the butted interface and the lapped portion of the crimp terminal via laser light irradiation, the X- and Y-axis scanner scanning laser light outputted from a laser light source in a two dimensional plane in an X-axis direction and a Y-axis direction, the X-axis direction being orthogonal to the Y-axis direction;
    performing welding via laser light irradiation while the crimp terminal is being held by the holding mechanism; and
    conveying the chained terminal at a constant pitch corresponding to intervals at which the crimp terminals are arranged.

7. The laser welding apparatus according to claim 3, wherein one of the pair of clamps has a pair of inclined contact surfaces and the other clamp has a substantially flat contact surface, the pair of clamps being adapted such that the pair of clamps contacts the crimp portion at three contact points while sandwiching the crimp portion.

8. The laser welding apparatus according to claim 1, wherein:
    the butted interface includes two straight portions and a curved portion between the straight portions;
    the measuring device is further adapted to measure sizes of the straight portions and the curved portion; and
    the welding device is further adapted to carry out laser irradiation based on data of measured sizes.

9. The laser welding apparatus according to claim 1, wherein the lapped portion is welded at a position at a predetermined distance from the lowest point of the curved portion so that a scan line for the lapped portion crosses a scan line for the butted interface.

10. The laser welding apparatus according to claim 1, wherein the curved portion is inclined with respect to the straight portions.

11. The laser welding apparatus according to claim 1, further comprising a Z-axis scanner, wherein the scanner control device is adapted to further control driving of the Z-axis scanner when the butted interface and the lapped portion are being welded via laser light irradiation.

* * * * *

UNITED STATES PATENT AND TRADEMARK OFFICE
CERTIFICATE OF CORRECTION

PATENT NO. : 9,694,443 B2  
APPLICATION NO. : 14/832275  
DATED : July 4, 2017  
INVENTOR(S) : Yagi et al.

Page 1 of 1

It is certified that error appears in the above-identified patent and that said Letters Patent is hereby corrected as shown below:

On the Title Page

In Column 1, (71) Applicant should appear as follows: Applicants: Furukawa Electric Co., Ltd., Tokyo (JP); Furukawa Automotive Systems Inc., Shiga (JP)

In Column 1, (73) Assignee should appear as follows: Assignees: Furukawa Electric Co., Ltd., Tokyo (JP); Furukawa Automotive Systems Inc., Shiga (JP)

Signed and Sealed this  
Tenth Day of July, 2018

Andrei Iancu  
*Director of the United States Patent and Trademark Office*